(12) United States Patent
Bischoff et al.

(10) Patent No.: US 11,669,070 B2
(45) Date of Patent: Jun. 6, 2023

(54) METHOD AND DEVICE FOR SETTING AT LEAST ONE PARAMETER OF AN ACTUATOR CONTROL SYSTEM, ACTUATOR CONTROL SYSTEM AND DATA SET

(71) Applicant: ROBERT BOSCH GMBH, Stuttgart (DE)

(72) Inventors: Bastian Bischoff, Esslingen (DE); Julia Vinogradska, Stuttgart (DE); Jan Peters, Darmstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 687 days.

(21) Appl. No.: 16/625,223

(22) PCT Filed: Jun. 27, 2018

(86) PCT No.: PCT/EP2018/067213
§ 371 (c)(1),
(2) Date: Feb. 11, 2020

(87) PCT Pub. No.: WO2019/002349
PCT Pub. Date: Jan. 3, 2019

(65) Prior Publication Data
US 2020/0201290 A1    Jun. 25, 2020

(30) Foreign Application Priority Data
Jun. 30, 2017   (DE) .................... 10 2017 211 209.3

(51) Int. Cl.
*G05B 13/02*   (2006.01)
*G05B 19/4155*   (2006.01)
(Continued)

(52) U.S. Cl.
CPC ........... *G05B 19/4155* (2013.01); *G06N 7/01* (2023.01); *G06N 20/00* (2019.01); *G05B 2219/49275* (2013.01)

(58) Field of Classification Search
CPC .................................................. G05B 19/4155
(Continued)

(56) References Cited

U.S. PATENT DOCUMENTS

| | | | |
|---|---|---|---|
| 9,429,235 B2 * | 8/2016 | Krosschell | F16H 61/66259 |
| 2004/0198268 A1 * | 10/2004 | Rashev | H03F 1/0277 |
| | | | 455/115.1 |
| 2021/0191347 A1 * | 6/2021 | Bischoff | G05B 13/0265 |

FOREIGN PATENT DOCUMENTS

DE   202017102235 U1   5/2017

OTHER PUBLICATIONS

Bischoff et al., "Policy search for learning robot control using sparse data", May 31, 2014, 6 pages [online][retrieved on Sep. 22, 2022], Retrieved from <https://ieeexplore.ieee.org/document/6907422?arnumber=6907422> (Year: 2014).*
(Continued)

*Primary Examiner* — Evral E Bodden
(74) *Attorney, Agent, or Firm* — Blueshift IP, LLC; Robert Plotkin (57) ABSTRACT

Method for automatically setting at least one parameter of an actuator control system, which is set up for controlling a control variable of an actuator to a predefinable target value, wherein the actuator control system is set up, depending on the at least one parameter, the target value and the control variable, to generate a manipulated variable and depending on this manipulated variable to control the actuator, wherein a new value of the at least one parameter is selected depending on a long-term cost function, wherein this long-term cost function is determined depending on a predicted temporal evolution of a probability distribution of the control variable
(Continued)

of the actuator and the parameter is then set to this new value.

12 Claims, 6 Drawing Sheets

(51) Int. Cl.
  *G06N 20/00* (2019.01)
  *G06N 7/01* (2023.01)
(58) Field of Classification Search
  USPC .......................................................... 700/28
  See application file for complete search history.

(56) References Cited

OTHER PUBLICATIONS

Julia Vinogradska et al.: "Stability of Controllers for Gaussian Process Forward Models", 2016, pp. 1-10, [online][retrieved on Sep. 22, 2022], Retrieved from <http://proceedings.mlr.press/v48/vinogradska16.pdf> (Year: 2106).*

Bischoff et al., "Policy Search for Learning Robot Control Using Sparse Data," 2014 IEEE International Conference on Robotics and Automation (JCRA), IEEE, May 31, 2014, pp. 3882-3887, DOI: 10.1109/ICRA.2014.6907422, XP032650510.

Goyal, "Online Learning and Planning of Dynamical Systems Using Gaussian Processes," Master's Theses (Open), Jan. 13, 2015, Retrieved from the Internet: <https://scholarbank.nus.edu.sg/handle/10635/119798> XP055508571.

Vinogradska et al., "Stability of Controllers for Gaussian Process Forward Models," Journal of Machine Learning Research, vol. 18 (2017) pp. 1-37, Retrieved from the Internet: <http://www.jmlr.org/papers/volume18/16-590/16-590.pdf>, XP055508111.

International Search Report dated Oct. 1, 2018 in International Patent Application No. PCT/EP2018/067213, 3 pages.

International Preliminary Report on Patentability dated Dec. 31, 2019 in International Patent Application No. PCT/EP2018/067213, 9 pages.

* cited by examiner

METHOD AND DEVICE FOR SETTING AT LEAST ONE PARAMETER OF AN ACTUATOR CONTROL SYSTEM, ACTUATOR CONTROL SYSTEM AND DATA SET

The invention relates to a method for automatically setting at least one parameter of an actuator control system, a computer program and a learning system for performing the method, a machine-readable storage medium on which the computer program is stored, an actuator control system whose parameter has been set by this method, and a record, which includes this parameter.

STATE OF THE ART

From DE 10 2013 212 889 A1, a method for creating a control function is known in order to control at least one physical state variable of a physical unit using at least one manipulated variable to at least one predefined target value, comprising the following steps:
providing a functional model for mapping a physical entity;
providing a control function with control parameters, wherein the control function generates the manipulated variable as a function of the physical state variable; and
Adjusting the control parameters based on the calculated total costs, wherein the total costs are formed from a combination of function values of a cost function.

Advantage of the Invention

The method with the features of independent claim 1, has the advantage that an optimal setting of the actuator control system to different actuators is possible. Advantageous further developments are the subject matter of the independent claims.

DISCLOSURE OF THE INVENTION

In a first aspect, the invention relates to a method for automatically setting at least one parameter of an actuator control system for controlling a control variable of an actuator to a predefinable target value, wherein the actuator control system is set up, depending on the at least one parameter of the target value and the control variable, to generate a manipulated variable and control the actuator depending on this manipulated variable, wherein a new value of the at least one parameter is selected depending on a long-term cost function, wherein this long-term cost function is determined depending on a predicted temporal evolution of a probability distribution of the control variable of the actuator, so that parameter can then be set to this new value.

The long-term cost function here is a cost function which is determined over a look-ahead interval, i.e. the predicted temporal evolution of the probability distribution is determined over this look-ahead interval and the long-term cost function is in turn determined depending thereon.

In an advantageous development, a model is provided. This model can be in particular a Gaussian process, advantageously a sparse Gaussian process. The predicted temporal evolution is then determined by means of this model. This makes the method particularly powerful.

In a further development of this aspect, it can be provided that the model is adapted depending on the manipulated variable which is supplied to the actuator when the actuator control system controls the actuator. The model is also adjusted depending on the resulting control variable. By "adaptation of the model" it can be understood here that model parameters which characterize the behavior of the model are adapted.

Once the model has been adapted, an (optimal) new value of the at least one parameter is then again determined as a function of the predicted evolution of the probability distribution of the control variable of the actuator (and the parameter is then set again to this new value). The re-determination of the new value of the at least one parameter is determined depending on the now adapted model.

That is, in this development, an episodic approach is provided in which the model is first improved (by observing the behavior of the real actuator when controlling the real actuator with the actuator control system). Subsequently, the actuator control system is improved by optimizing the parameters, the control strategy of the actuator control system under simulation of the reaction of the actuator by the model. This sequence of model improvement and parameter adjustment can be repeated several times.

This procedure has the advantage that the model and actuator control system are successively improved, thus resulting in a particularly good adaptation of the actuator control system.

In a further particularly advantageous aspect, it can be provided that the expected temporal evolution of the probability distribution of the control variable is determined by an approximation of an integration over possible values of the control variable, this approximation being done by numerical quadrature. "Numerical quadrature" here means an approximation method which approximates the integral by evaluating the integrand at supporting points and support weights associated with the supporting points.

The expected temporal evolution can be determined by means of a (Gaussian) process with one or more time steps. The Gaussian process hereby models for each fixed state of a time step a probability distribution with assigned mean value and associated variance of the following state (i.e. the state at a next time step).

The use of numerical quadrature, in particular in connection with the use of Gaussian processes, has the advantage that the solution is numerically particularly simple, while at the same time the accuracy of the approximation is very good, so that the actuator control system thus produced becomes particularly efficient.

In an advantageous refinement, a density of the supporting points is determined as a function of a determined temporal evolution of the control variable, determined in particular by means of the model and/or the actuator control system, starting from an initial value of the control variable (pseudo-)randomly determined from an initial probability distribution, i.e. the initial value is in this case "sampled" in particular from the initial probability distribution. Thus, a temporal evolution (i.e. a trajectory in the state space) of the control variable is determined, at the starting point of which the control variable assumes the randomly determined initial value. The density of the supporting points is then chosen as a function of this temporal evolution. This leads to an efficient choice of the supporting points, since actual trajectories of the control variable are adequately included in the choice of supporting points. This can ensure in particular that the method works reliably even if the parameter of the actuator control system is not yet well adapted.

In a further development, it can be provided that the density of supporting points is also determined as an initial value of the control variable as a function of a determined temporal evolution of the control variable (starting from the target value), determined in particular by means of the model and/or the actuator control system. This has the advantage that the supporting points are chosen to be particularly efficient, since in a convergence of the method it can be assumed that an actual trajectory of the control variable is in the vicinity of a trajectory on which the control variable assumes the target value.

Specifically, it may be provided that the density of supporting points is selected as a function of a variable that characterizes a smoothness of the model at at least one value of the control variable in the determined temporal evolution(s) of the control variable. The term "smoothness of the model" can be understood more precisely to mean the smoothness of the model prediction, i.e. the smoothness of a probability distribution predicted for the following next time step. A slight smoothness of the model here means that larger differences are to be expected in the temporal evolutions between successive time steps than in cases in which the smoothness of the model has a higher value.

In particular, this variable characterizing the smoothness model may be a variance of the Gaussian process associated with at least one of the values that the control variable assumes in the one or more determined temporal evolutions. The greater this variance, the lower the smoothness of the model.

In this way it can be ensured that the choice of the supporting points is chosen such that an error of the approximation, in particular of the numerical quadrature, becomes particularly small.

To do this optimally, the density of supporting points may be chosen in a range dependent on a smallest value, wherein this smallest value is a minimum value from the values characterizing a smoothness of the model to those values of the control variable which are in this range. This means that one or more temporal evolutions of the control variable are determined as a discrete sequence of values that the control variable assumes. Only those values of the discrete sequence of values which lie in the aforementioned range are then considered. Each of these values is assigned a variable that characterizes the smoothness of the model at this point. From these assigned values, the smallest value is selected.

Alternatively or additionally, the density of supporting points in a region may also be selected as a function of an average density of supporting points in this region. In particular, it may be provided that the density of supporting points is increased when a quotient of average density of supporting points and the smallest value falls below a predefinable threshold value, in particular the value 1. Such a method is particularly easy to implement.

An increase in the average density of supporting points can be achieved by reducing a volume element to which a rule for generating supporting points is reduced, for example by dividing an existing volume element into a plurality of smaller volume elements and then to generate nodes for each of these smaller volume elements by means of the generated of supporting points.

In a further aspect, it can be provided that the determination of a result of the numerical quadrature is effected as a function of a determination of a time evolution of weights, wherein the weights are respectively given by the product of support weights and the respective values of the probability density at the associated supporting point.

This has the advantage that the temporal evolution of these products can be carried out particularly efficiently from time step to time step as matrix multiplication. The evaluation of the function describing the probability density must be done only once at each supporting point. This method can be particularly well parallelized and thus perform particularly efficiently on one or more GPUs.

In a further aspect of the invention, it can be provided that the long-term cost function is selected as a function of a local cost function, wherein the local cost function is selected as a function of a Gaussian function and/or a polynomial function which is dependent on a difference between the manipulated variable and the predefinable target value. The cost function can be chosen, for example, as a linear combination of Gaussian function and polynomial function. Such a choice of cost function is particularly easy.

Advantageously, in yet another aspect, it can be provided that the manipulated variable is limited to values within a predefinable manipulated variable range by means of a limitation function. This allows a particularly simple limitation of the manipulated variable.

In further aspects, the invention relates to a learning system for automatically setting at least one parameter of an actuator control system which is set up for controlling a control variable of an actuator to a predefinable target value, wherein the learning system is configured to perform one of the aforementioned methods.

As mentioned, aspects of the method may be performed particularly efficiently on one or more GPUs. The learning system may therefore advantageously comprise one or more GPUs for performing the method.

Hereinafter, embodiments of the invention will be explained in more detail with reference to the accompanying drawings. In the drawings.

DESCRIPTION OF THE EXEMPLARY EMBODIMENTS

Figure 1:
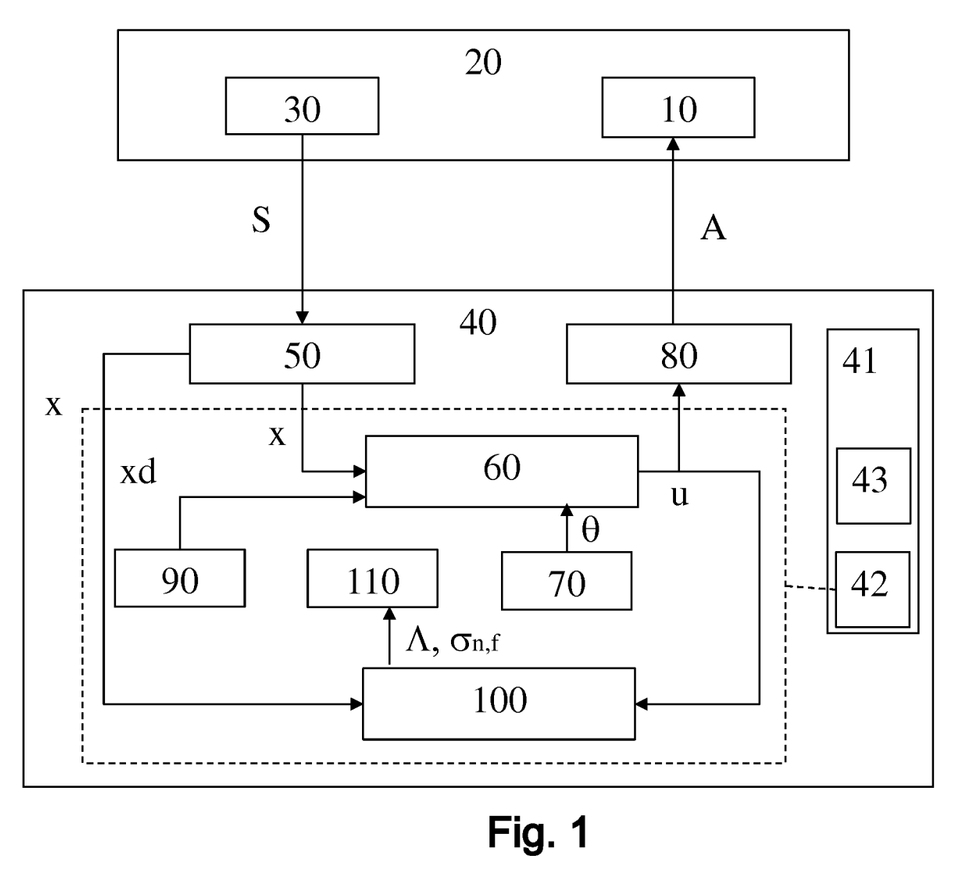
FIG. 1 schematically shows an interaction between learning system and actuator.

FIG. 1 shows the actuator 10 in its environment 20 in interaction with the learning system 40. Actuator 10 and environment 20 are collectively referred to below as the actuator system. A state of the actuator system is detected by a sensor 30, which may also be provided by a plurality of sensors. An output signal S of the sensor 30 is transmitted to the learning system 40. The learning system 40 determines therefrom a drive signal A, which the actuator 10 receives.

The actuator 10 can be, for example, a (partially) autonomous robot, for example a (partially) autonomous motor vehicle, a (partially) autonomous lawnmower. It may also be an actuation of an actuator of a motor vehicle, for example, a throttle valve or a bypass actuator for idle control. It may also be a heating system or a part of the heating system, such as a valve actuator. The actuator 10 may in particular also be larger systems, such as an internal combustion engine or a (possibly hybridized) drive train of a motor vehicle or even a brake system.

The sensor 30 may be, for example, one or more video sensors and/or one or more radar sensors and/or one or more ultrasonic sensors and/or one or more position sensors (for example GPS). Other sensors are conceivable, for example, a temperature sensor.

In another exemplary embodiment, the actuator 10 may be a manufacturing robot, and the sensor 30 may then be, for example, an optical sensor that detects characteristics of manufacturing products of the manufacturing robot.

The learning system 40 receives the output signal S of the sensor in an optional receiving unit 50, which converts the output signal S into a control variable x (alternatively, the output signal S can also be taken over directly as the control variable x). The control variable x may be, for example, a section or a further processing of the output signal S. The control variable x is supplied to a controller 60, in which a control strategy π is implemented.

In a parameter memory 70, parameters θ are stored, which are supplied to the controller 60. The parameters θ parameterize the control strategy π. The parameters θ can be a singular or a plurality of parameters.

A block 90 supplies the controller 60 with the predefinable target value xd. It can be provided that the block 90 generates the predefinable target value xd, for example, as a function of a sensor signal that is predefined for the block 90. It is also possible for block 90 to read the target value xd from a dedicated memory area in which it is stored.

Depending on the control strategy π(θ) (and thus dependent on the parameters θ), on the target value xd and the control variable x, the controller 60 generates a manipulated variable u. This can be determined, for example, depending on a difference x-xd between the control variable x and the target value xd.

The controller 60 transmits the manipulated variable u to an output unit 80, which determines the drive signal A therefrom. For example, it is possible that the output unit first checks whether the manipulated variable u is within a predefinable value range. If this is the case, the control signal A is determined as a function of the manipulated variable u, for example by an associated control signal A being read from a characteristic field as a function of the manipulated variable u. This is the normal case. If, on the other hand, it is determined that the manipulated variable u is not within the predefinable value range, it can be provided that the actuation signal A is designed such that it converts the actuator A into a safe mode.

Receiving unit 50 transmits the control variable x to a block 100. Similarly, controller 60 transmits the corresponding manipulated variable u to block 100. Block 100 stores the time series of the control variable x received at a sequence of times and the respective corresponding manipulated variable u. Block 100 can then adapt model parameters $\Lambda$, $\sigma_n$, $\sigma_a$ of model g on the basis of these time series. The model parameters $\Lambda$, $\sigma_n$, $\sigma_f$ are supplied to a block 110, which stores them, for example, at a dedicated memory location. This will be described in more detail below in FIG. 4, step 1030.

The learning system 40, in one embodiment, comprises a computer 41 having a machine-readable storage medium 42 on which a computer program is stored that, when executed by the computer 41, causes it to perform the described functionality of the learning system 40. In the exemplary embodiment, the computer 41 comprises a GPU 43.

Figure 2:
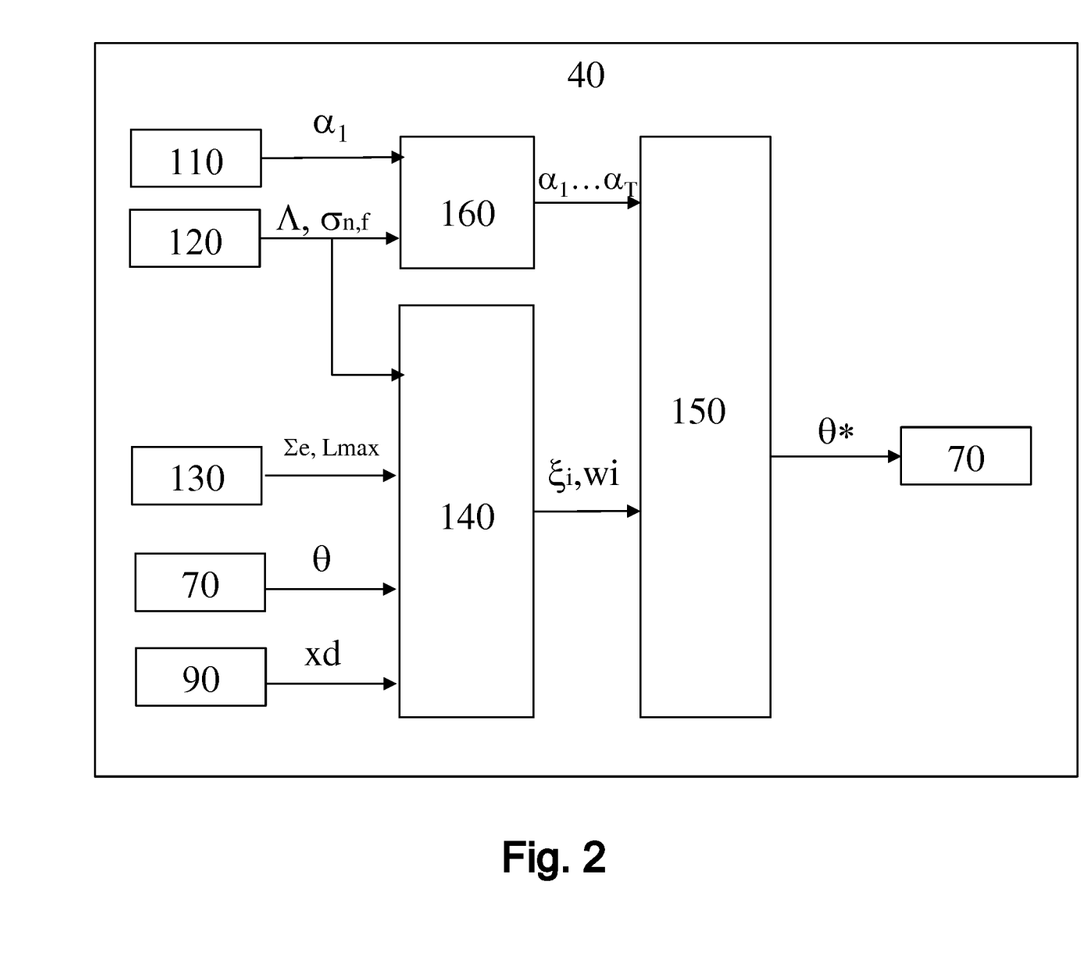
FIG. 2 schematically shows a structure of parts of the learning system.

The model g can be used to optimize the parameters θ of the control strategy n. This is schematically illustrated in FIG. 2.

An initial probability distribution $p(x_0)$ of the control parameter x is stored in a block. The block 110 determines therefrom a first weight vector $\alpha_1$ and transmits this first weight vector $\alpha_1$ to a block 160. Function and an embodiment of the determination of the first weight vector ac are described below in FIG. 5, step 1500.

Block 120 also communicates the model parameters $\Lambda$, $\sigma_n$, $\sigma_f$ to block 160. Block 160 determines from the first weight vector ac and the model parameters $\Lambda$, $\sigma_n$, $\sigma_f$ a sequence of weight vectors $\alpha_1, \alpha_2, \ldots \alpha_T$ to hand over to a block 150.

Block 120 also transmits the model parameters $\Lambda$, $\sigma_n$, $\sigma_f$ to a block 140. A block 130 determines a noise variance $\Sigma_\varepsilon$, and a maximum partitioning depth Lmax (for example, by these values being predefined and read from dedicated memory locations in memory) and transmits them to the block 140. Parameter memory 70 transmits parameters θ to block 140, block 90 transmits the target value xd to block 140.

Figure 6:
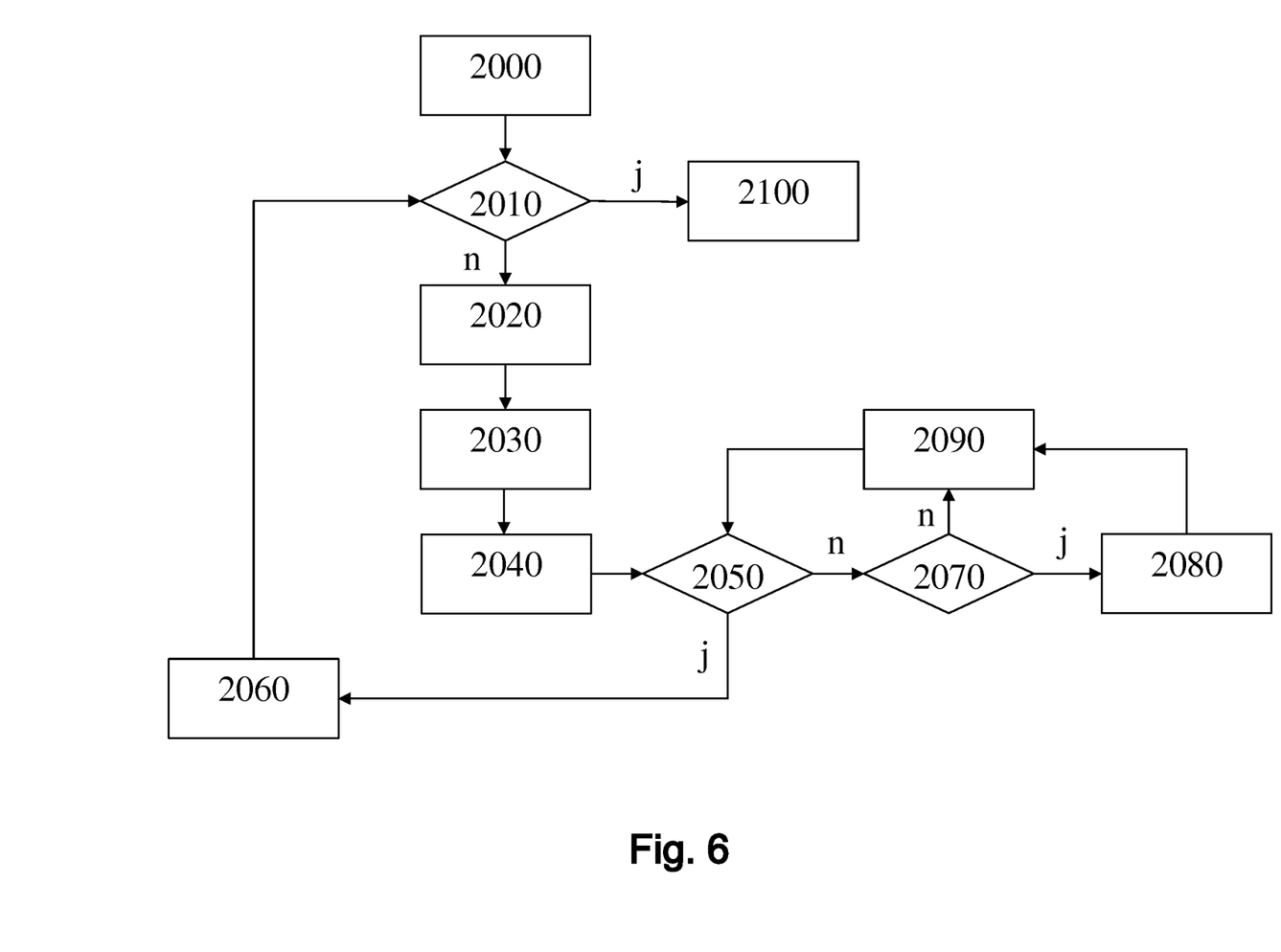
FIG. 6 shows in a flowchart an embodiment of the method for determining the supporting points.

Block 140 determines from these values supporting points $\xi_i$ and associated support weights $w_i$. An embodiment of the algorithm of this determination is illustrated in FIG. 6. The determined supporting points $\xi_i$ and associated support weights $w_i$ are handed over to the block 150.

Block 150 determines new parameters θ* from these supporting points and support weights. This is described in FIG. 4, step 1050. The new parameters θ* are transferred to the parameter memory 70, where the values of the parameters θ are replaced by the respectively corresponding values of the new parameters θ*.

The blocks shown in FIG. 2 can be part of the learning system 40 and implemented there as part of a computer program and stored on the machine-readable storage medium 42 as described in connection with FIG. 1.

Figure 3:
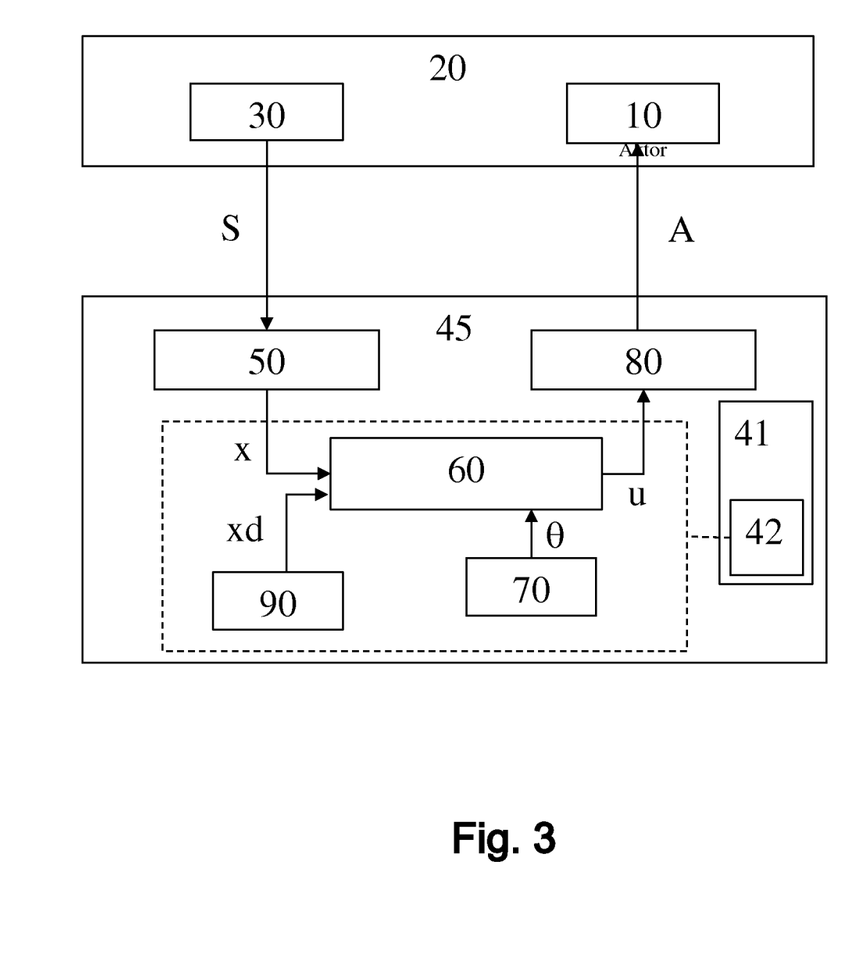
FIG. 3 schematically shows an interaction between actuator control system and actuator.

FIG. 3 illustrates the interaction of the actuator control system 45 with the actuator 10. The structure of the actuator control system 45 and its interaction with the actuator 10 and sensor 30 is similar in many parts to the structure of the learning system 40, which is why only the differences are described here. In contrast to the learning system 40, the actuator control system 45 has no block 100 and no block 110. The transmission of variables to the block 100 is therefore eliminated. In the parameter memory 70 of the actuator control system 45, parameters θ are stored, which were determined by the method according to the invention, for example, as illustrated in FIG. 4.

Figure 4:
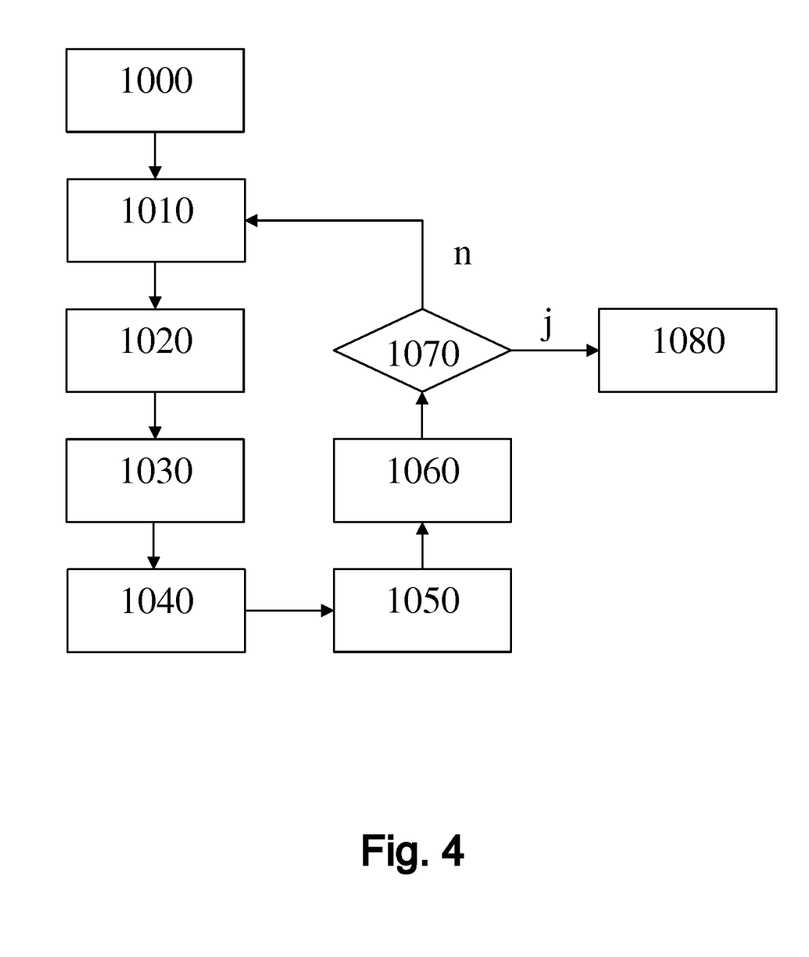
FIG. 4 shows in a flowchart one embodiment of the method for training the actuator control system.

FIG. 4 illustrates an embodiment of the method according to the invention. First (1000) the parameters θ are set to initial values. The parameters θ can be initialized randomly, but they can also be predefined.

Depending on the control strategy π(θ), the controller 60 then (1010) generates, as described in FIG. 1 manipulated variables u, with which, as described in FIG. 1, the actuator 10 is driven. The actuator 10 interacts via the environment 20 with the sensor 30, whose sensor signal S is received as a control variable x indirectly or directly from the controller 60.

Block 100 receives and aggregates (1020) the time series of manipulated variable u and control variable x which together result in a pair z of control variable x and manipulated variable x, $z=(x^1, \ldots x^D, u^1 \ldots u^F)^T$. P D is the dimensionality of the control variable x and F is the dimensionality of the manipulated variable u, i.e. $x \in \mathbb{R}^D$, $u \in \mathbb{R}^F$.

Depending on this state trajectory, then (1030) a Gaussian process g is adapted such that between successive times t, t+1 the following applies $$x_{t+1} = x^t + g(x_t, u_t). \quad (1)$$

Here $$u_t = \theta_\pi(x_t). \quad (1')$$

A covariance function k of the Gaussian process g is given by, for example $$k(z,w) = \sigma_f^2 \exp(-\frac{1}{2}(z-w)^T \Lambda^{-1}(z-w)). \quad (2)$$

Parameter $\sigma_f^2$ is a signal variance, $\Lambda = \text{diag}(l_1^2 \ldots l_{D+F}^2)$ is a collection of squared length scales $l_1^2 \ldots l_{D+F}^2$, for each of the D+F input dimensions.

A covariance matrix K is defined by $$K(Z,Z)_{i,j} = k(z^i, z^j). \quad (3)$$

The Gaussian process g is then characterized by two functions: By an average μ and a variance Var, which are given by $$(z_*) = k(z_*, Z)(K(Z,Z) + \sigma_n^2 I)^{-1} y, \quad (4)$$

$$\text{Var}(z_*) = k(z_*, z_*) - k(z_*, Z)(K(Z,Z) + \sigma_n^2 I)^{-1} k(Z, z_*). \quad (5)$$

Here y is given in the usual way by $y^i = f(z^i) + \in^i$, with white noise $\in^i$.

The parameters $\Lambda, \sigma_t, \sigma_f$ are then matched to the pairs $(z^i, y^i)$ in a known manner by maximizing a logarithmic marginal likelihood function.

Then (1040) (as described in FIG. 6) supporting points $\xi_i$ and associated support $w_i$ weights are determined. Furthermore, a look-ahead range T is read out of a memory area and (as described in FIG. 5) weight $\alpha_i$ vectors are determined.

Subsequently (1050) new, optimal parameters θ* are determined. For this purpose, a predefined, local cost function r (x) is used, which can be defined for example by a characteristic diagram or a mathematical function.

For each value of a variable n=1 ... N, an estimated expected value E of the local cost function r is now determined:

$$E_{x \sim \phi_n}[r(x)] = \int r(x) \phi_n(x) dx \quad (6)$$

The basis functions $\phi_n(x)$ are given by $$\phi_n = (x) = p(x_{t+1} = x | x_t = \xi_n) \quad (7)$$

i.e. by a normal distribution with mean $\xi_n + \mu(\xi_n)$ and variance $\text{Var}(\xi_n)$.

From this an approximation $\tilde{R}_\pi(\theta)$ is finally determined. For this purpose, the weight $\alpha_t = (\alpha_{t,1}, \ldots \alpha_{t,n})$ vectors determined for each time step t and the expected values E described above are used:

$$\tilde{R}_\pi(\theta) = \sum_{t=0}^{T} \sum_{n=1}^{N} \alpha_{t,n} E_{x \sim \phi_n}[r(x)] \quad (8)$$

This approximation $\tilde{R}_\pi(e)$ is an approximation by numerical quadrature of a cost function R given by $$R_\pi(\theta)) = \sum_{t=0}^{T} E_{x_t}[r(x_t)]. \quad (9)$$

A determination of the expected values E requires an integration over the probability distribution $p(x_t)$ for each of the times t. This cannot be solved analytically in a closed form, since the temporal evolution of the probability distribution p from one time step t to the next t+1 is given by $$p(x_{t+1}) = \int p(x_{t+1}|x_t) p(x_t) dx_t \quad (10)$$

The solution of this equation must therefore be done by numerical approximation methods. Many methods for determining this temporal evolution of the probability distribution p face the challenge of achieving sufficient accuracy without becoming very computationally intensive. The numerical quadrature method surprisingly achieves these goals.

The new parameter θ* is now determined (1060) as $$\theta^* = \arg\max_\theta \tilde{R}_\pi(\theta). \quad (11)$$

This can be done, for example, with a gradient descent method in which the gradients are determined numerically or predefined analytically. Also, exploratory methods are possible. The parameter θ is replaced by the new parameter θ*.

Then (1070) it is optionally checked whether the method of determining the parameter θ has converged. If this is not the case ("n"), a branch is made back to step 1010. On the other hand, if this is the case ("j"), optimal parameters θ are found, and the method is terminated (1080). Of course, the method can also be terminated after a single iteration.

Figure 5:
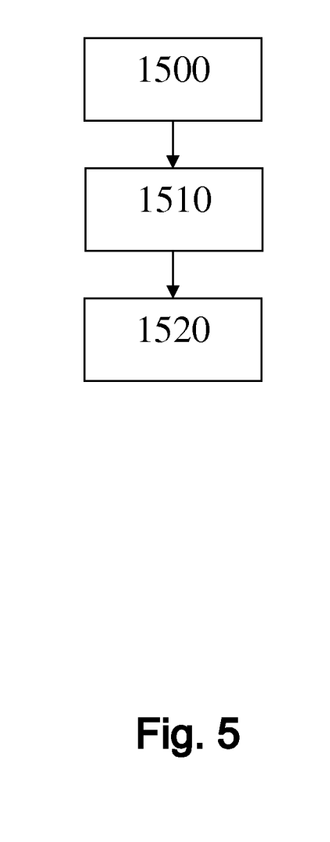
FIG. 5 shows in a flowchart an embodiment of the method for determining the temporal evolution of the probability density.

FIG. 5 illustrates the method for determining the weight vectors $\alpha_t$.

First (1500) the first weight vector $p(x_0)$ is determined from the predefined initial probability distribution $p(x_0)$, according to $$\alpha_{1,i} = w_i \cdot p(x_0 = \xi_i) \quad (12)$$

Then (1510) the matrix $$M = \text{diag}(w) \Phi \quad (13)$$

is determined with $$\text{diag}(w)_{i,j} = w_i \delta_{i,j} \quad (14)$$

and $$\Phi_{i,j} = \phi_j(\xi_i) \quad (15)$$

Finally, (1520) the weight vectors $\alpha_2, \ldots \alpha_T$ are generated iteratively with $$\alpha_{t+1} = M \alpha_t. \quad (16)$$

This ends this method.

FIG. 6 illustrates the method for determining the supporting points $\xi_i$ and the associated support weights $w_i$.

First, a division is initialized to a state space X of all possible values of the control variable x. For example, the division can be initially chosen as the trivial division of the state space X, i.e. the state space X is not divided at all, but is given by the entire state space X.

A counter s is initialized to the value s=1. The supporting points $\xi_i$ are determined in accordance with a numerical quadrature rule (such as Kepler's rule, the trapezoidal rule, the Simpson rule or the Gauss quadrature) for the state space X, as well as the associated support weights $w_i$.

Then (2010) it is checked whether the counter s has reached the maximum partitioning depth Lmax. If so, the method is ended in step 2100.

Otherwise, the target value xd is assumed to be the value $\tau_0'$ for the control variable x and, using formula (1), (1'), a temporal evolution $\tau_0', \tau_1' \ldots \tau_T'$ is determined (2020).

Optionally, a further value $\tau_0$ is then also randomly selected for the control variable x according to the initial probability distribution $p(x_0)$, and with formula (1), (1) analogous to step 2020, a further temporal evolution $\tau_0, \tau_1, \ldots \tau_T$ is determined (2030).

Then another counter I is initialized to the value I=1 (2040) and it is checked (2050) to see if the further counter I has reached the value of the counter s. If so, step 2060 follows, in which the counter s is incremented by one and branched back to step 2010. If this is not the case, the variable $\rho_i(\tau)$ is determined (2070), which characterizes whether the density of the supporting points $\xi_i$ is appropriate. For example, it can be determined $$\rho_l(\tau) = \frac{vol(X_l)}{N_l \min_{\tau_i \tau_i' \in X_l} Var(\tau_i)}. \qquad (16)$$

Here, $X_i$ is the i-th subvolume element of the partitioning of the state space X, $Vol(X_i)$ its volume, and $N_l$ the number of supporting points $\xi_i$ therein. It is then checked (2070) whether this variable is $\rho_i(\tau)<1$, although other threshold values than the value "1" are possible.

If this is the case ("j"), a partial volume $X_l$ element is split (2080) into a plurality of smaller sub-volume elements, for example, by halving the partial volume $X_l$ element along one or all of its dimensions. Then, $X_l$ the supporting points $\tau_i$ associated with the partial volume element and associated support weights $w_i$ are removed and, for each of the newly generated smaller partial volume elements, supporting points $\xi_i$ and associated support weights $w_i$ are added. Then, step 2090 follows, in which the further counter I is incremented by one. Thereafter, it branches back to step 2050.

If the check in step 2070 indicates that the condition is not met ("n"), step 2090 follows immediately.

The invention claimed is:

1. Method for automatically setting at least one parameter (θ) of an actuator control system (45), which is set up for controlling a control variable (x) of an actuator (20) to a predefinable target value (xd), wherein the actuator control system (45) is set up, depending on the at least one parameter (θ), the target value (xd) and the control variable (x) to generate a manipulated variable (u) and depending on this manipulated variable (u) to control the actuator (20), wherein a new value (θ*) of the at least one parameter (θ) is selected depending on a long-term cost function (R), wherein this long-term cost function (R) is determined depending on a predicted temporal evolution (F) of a probability distribution (P) of the control variable (x) of the actuator (20) and the parameter (☐) is then set to this new value (θ*);

wherein the expected temporal evolution (F) of the probability distribution (p) of the control variable (x) is determined by an approximation of an integration over possible values of the control variable (x), this approximation being done through numerical quadrature;

wherein a density of the supporting points (ξ) depends on a determined temporal evolution (τ1 ... τT), determined in particular by means of at least one of the model (g) and the actuator control system (45), of the control variable (x), starting from a randomly determined initial value (τ0) of the control variable (x) from an initial probability distribution (p(x0)); and wherein the density of supporting points (ξ) also depends on a determined temporal evolution (τ'1 ... τ'T) of the control variable (x), determined in particular by means of at least one of the model (g) and the actuator control system (45), starting from the target value (xd) as the initial value (τ'0) of the control variable (x).

2. The method of claim 1, wherein the predicted temporal evolution (F) is determined as a function of a model (g), in particular a Gaussian process, advantageously a sparse Gaussian process, of the actuator (20).

3. The method of claim 2, wherein the model (g), depending on the manipulated variable (u), which is supplied to the actuator (20) with the actuator control system (45) in a control of the actuator (20), and then adapted to the resulting control variable (x), wherein after the adaptation of the model (g) a new value (θ*) of the at least one parameter (θ) is again determined, depending on the predicted evolution (F) of the probability distribution (p) of the control variable (x) of the actuator (20), wherein the redetermination of the new value (θ*) of the at least one parameter (θ) is determined depending on the now adapted model (g).

4. A method according to claim 1, wherein a density of supporting points (ξ) is selected depending on a variable (Var), which is a smoothness of the model (g) at at least one value (τ0 ... τT, τ'0 ... τ'T) of the control variable (x) in the one or more determined temporal evolutions of the control variable (x).

5. The method of claim 4, wherein the density of supporting points (ξ) is chosen in a range $(X_i)$ as a function of a minimum value (minVar), wherein the smallest value (minVar) is the smallest value of the variables (Var) characterizing a smoothness of the model on those values (τ0 ... τT, τ'0 ... τ'T) of the control variable (x), which are in this range $(X_i)$.

6. Method according to claim 1, wherein the density of the supporting points (ξ) of a range $(X_1)$ is also selected depending on a mean density of the supporting points (ξ) in this range $(X_1)$.

7. The method of claim 5, wherein the density of supporting points (ξ) is increased if a quotient of average density of supporting points (ξ) and the smallest value (min-Var) falls below a predefinable threshold value.

8. Method according to claim 1, wherein the determination of a result of the numerical quadrature is dependent on a determination of a temporal evolution of weights $(\alpha_i)$, wherein the weights $(\alpha_i)$ are given in each case by the product of support weights $(w_i)$ and the respective values of the probability density (p) at the associated supporting point $(\xi_i)$.

9. Method according to claim 1, wherein the long-term cost function (R) is selected as a function of a local cost function (r), the local cost function (r) being selected as a function of at least one of a Gaussian function and a polynomial function which depends on a difference between the manipulated variable (x) and the predefinable target value (xd).

10. Method according to claim 1, wherein the manipulated variable (u) is limited to values within a predefinable manipulated variable range by means of a limitation function (a).

11. Learning system (40) for automatically setting at least one parameter (θ) of an actuator control system (45), which is set up to control a control variable (x) of an actuator (20) to a predefinable target value (xd), wherein said learning system (40) is set up to carry out a method, wherein the actuator control system (45) is set up, depending on the at least one parameter (θ), the target value (xd) and the control variable (x) to generate a manipulated variable (u) and depending on this manipulated variable (u) to control the actuator (20), wherein a new value ($\theta^*$) of the at least one parameter ($\theta$) is selected depending on a long-term cost function (R), wherein this long-term cost function (R) is determined depending on a predicted temporal evolution (F) of a probability distribution (P) of the control variable (x) of the actuator (20) and the parameter ($\theta$) is then set to this new value ($\theta^*$);

wherein the expected temporal evolution (F) of the probability distribution (p) of the control variable (x) is determined by an approximation of an integration over possible values of the control variable (x), this approximation being done through numerical quadrature;

wherein a density of the supporting points ($\xi$) depends on a determined temporal evolution ($\tau 1 \ldots \tau T$), determined in particular by means of at least one of the model (g) and the actuator control system (45), of the control variable (x), starting from a randomly determined initial value ($\tau 0$) of the control variable (x) from an initial probability distribution (p(x0)); and wherein the density of supporting points ($\xi$) also depends on a determined temporal evolution ($\tau'1 \ldots \tau'T$) of the control variable (x), determined in particular by means of at least one of the model (g) and the actuator control system (45), starting from the target value (xd) as the initial value ($\tau'0$) of the control variable (x).

12. The learning system (40) according to claim 11, wherein the method is performed using a GPU (43), wherein the determination of a result of the numerical quadrature is dependent on a determination of a temporal evolution of weights ($\alpha_i$), wherein the weights ($\alpha_i$) are given in each case by the product of support weights ($w_i$) and the respective values of the probability density (p) at the associated supporting point ($\xi_i$).

* * * * *